March 27, 1934.                O. HENZE                1,952,756
FISHING REEL
Filed July 30, 1932
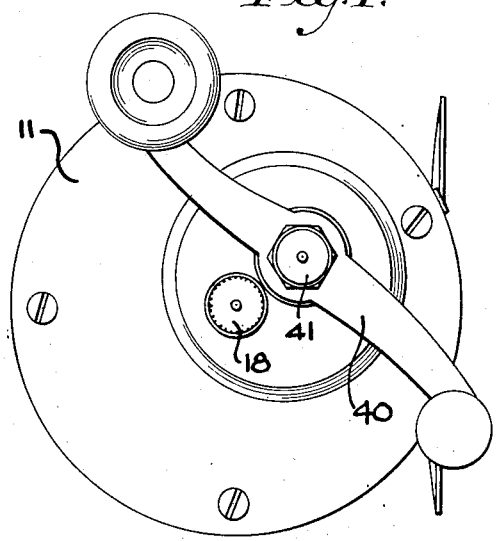
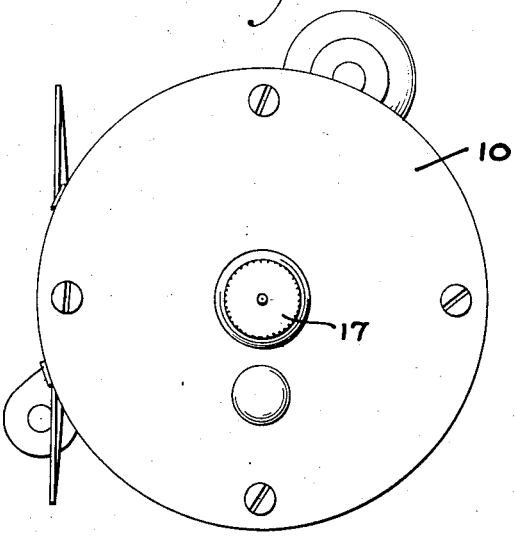
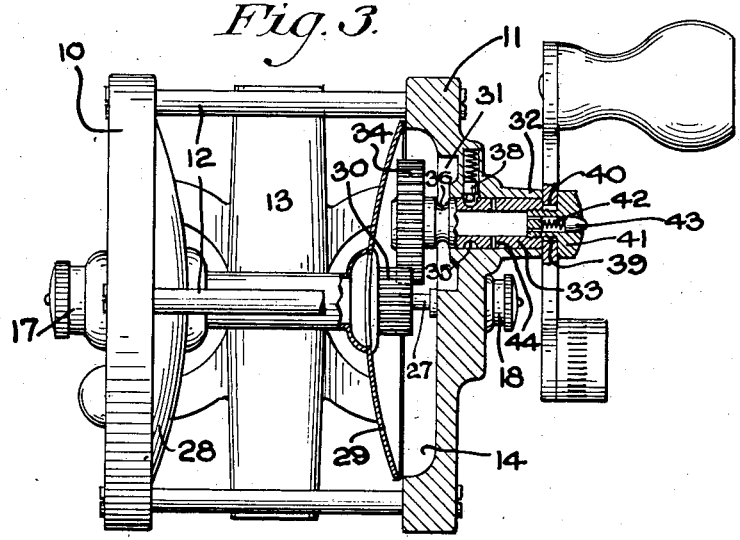
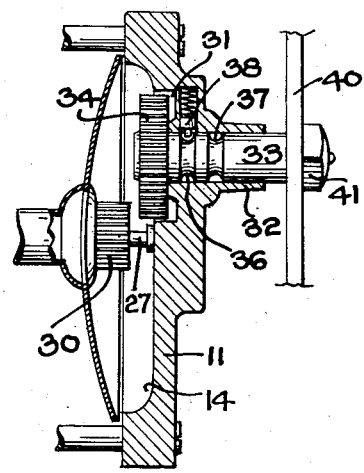
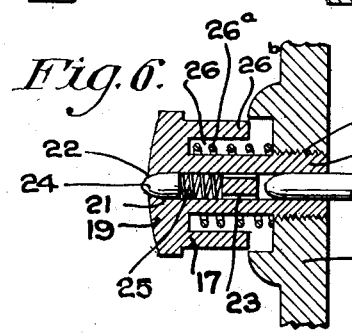
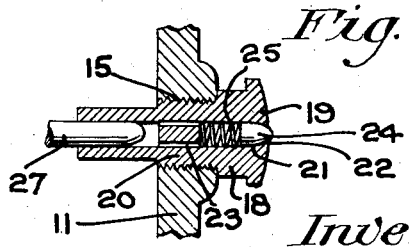
Inventor
OTTO HENZE
By Leo Edelson
       Attorney Patented Mar. 27, 1934

1,952,756

UNITED STATES PATENT OFFICE 1,952,756

FISHING REEL

Otto Henze, Philadelphia, Pa.

Application July 30, 1932, Serial No. 626,548

4 Claims. (Cl. 242—84.7)

This invention relates generally to improvements in fishing reels, more particularly that type known in the art as free-spool reels, wherein mechanism is provided for disconnecting the reel shaft from the operating crank shaft in order that the spool itself may revolve freely with no friction or drag to overcome other than that produced by its own bearings.

Among the principal objects of this invention is to provide in a reel of the character above described a mechanism for readily shifting the driving gear into or out of engagement with the driven gear, the latter being that gear which is splined or otherwise fixedly secured to the reel spindle, the arrangement being such that the entrainment or disentrainment of the gears is effected by the simple manipulation of the externally arranged operating crank or lever.

Another object of the present invention is the provision of a mechanism for disconnecting the spool pinion from the main driving gear through the manipulation of the external crank or lever and wherein means are provided for positively maintaining the crank shaft in either one or another of two axially spaced positions whereby the desired results are obtained.

A still further object of the invention is the provision of an improved oiling device which enables the rotating parts of the reel to be readily lubricated at the same time that it effectually prevents the entrance of any foreign matter, such as dirt, grit or the like into the bearings which accommodate the said moving parts. In this connection, it is a further object to provide a lubricating mechanism in the use of which it is unnecessary to remove any parts in order to afford access to the point to be lubricated.

Further objects of the invention, such as the provision of a free-spool reel which is exceedingly simple in construction, inexpensive to manufacture, efficient in operation and durable in use, will appear more fully hereinafter.

The invention consists substantially in the combination, construction, location and relative arrangement of parts, all as will appear more fully hereinafter, as shown in the accompanying drawing, and as finally pointed out in the appended claims.

In the said drawing:—

Figure 1 is an elevational view of the handle-equipped end of the reel;

Figure 2 is an elevational view of the opposite end thereof;

Figure 3 is a view showing a portion thereof in vertical cross-section;

Figure 4 is a vertical cross-sectional view showing the driving gear in disengaged position; and Figures 5 and 6 are vertical cross-sectional views of the opposed bearing elements.

Referring now more particularly to the drawing, it will be observed that the reel as constructed in accordance with and embodying the principles of the present invention comprises a pair of end plates or discs 10 and 11 which are secured together in the assembled relation shown by a plurality of pillars 12 and by a cross-plate 13 to which latter the fishing rod (not shown) is adapted to be attached.

As appears most clearly in Figure 3, the opposed surfaces of the end plates 10 and 11 are each recessed, as at 14, and in addition are respectively provided with centrally located interiorly threaded apertures 15 and 16. Threaded into the aperture 16 of the end plate 10 is a bearing element 17 while threaded into the aperture 15 of the end plate 11 is a bearing element 18. It will be observed that the bearing elements 17 and 18 are alike in that each is provided with a capped end 19 and a tubular threaded shank 20. Extending axially through the capped end 19 of each bearing element is a bore 21 constituting an oil duct, the outer extremity of this oil duct being of reduced diameter, as at 22. This duct 21 communicates with the interior of the threaded shank 20 by way of one or more passages 23. Arranged within the outer end of the duct 21 is an oil seal 24, the latter being normally maintained in outwardly pressed position by means of a coil spring 25 acting against the inner end of the oil seal 24. In order to inject lubricant into the interior of the threaded shank 20 of either bearing, it will be understood that it is merely necessary to press the oil seal 24 inwardly against the action of its spring 25 thereby opening the normally closed outer end of the duct 21 to permit lubricant to be introduced therethrough. Inasmuch as the oil seal 24 is normally in outwardly pressed position, there is effectually precluded any possibility of foreign matter, such as dirt, grit or the like, from entering into the interior of the threaded shank 20 of the bearing element.

It will be observed that the bearing element 17 differs from the bearing element 18 in that the former is designed for axial adjustment whereby to effect the proper centering of the spool assembly between the end plates 10 and 11. To this end, the bearing 17 is provided with an annular groove 26 within which is received a compression spring 26ᵃ, the inner end of the latter abutting the outer surface of the end plate 10. Preferably, the end plate 10 is provided with a seat within which the annular flange 26ᵇ of the bearing element 17 may be snugly accommodated as the latter is axially adjusted in position. The coil spring 26ᵃ is sufficiently strong in its action to maintain the bearing 17 in axially adjusted position.

Arranged between the end plates 10 and 11 is the rotatable spool assembly which includes the shaft 27 and the oppositely concaved end heads 28 and 29. As appears in Figure 3, the opposite ends of the shaft 27 project beyond the end heads for reception within the tubular shanks 20—20 of the bearing elements 17 and 18, respectively. Fixedly secured in any suitable manner to one end of the shaft 27 is a pinion 30, it being observed that the outer end of this pinion terminates in a plane spaced from the recessed surface 14 of the end plate 11. Provided in this recessed surface of the end plate 11 is a circular recess or pocket 31, this pocket being centrally apertured and provided with a sleeve 32 extending outwardly therefrom. Rotatably received within this sleeve 32 is a shaft 33 the inner end of which has fixedly secured thereto in any suitable manner the main driving gear 34 of the reel. The shaft 33 is slidably arranged within its sleeve 32 in such manner that the driving gear 34 may be shifted into one or the other of two axially spaced positions. Thus, as appears more clearly in Figure 4, when the shaft 33 is shifted outwardly with respect to the end plate 11 the gear 34 is seated within the recess 31 and is out of engagement with the spool pinion. When, however, the shaft is shifted inwardly toward the end plate 11, the driving gear 34 is shifted into mesh with the spool pinion 30 and consequently is entrained therewith.

In order to positively maintain the shaft 33 in one or the other of the positions just described, the shaft is provided with a pair of longitudinally spaced circumferentially extending grooves 36 and 37. The sleeve 32 is provided adjacent the inner end thereof with a radially projecting spring-pressed pin 38, the inner end of this pin being adapted for projection into one or the other of the grooves 36 and 37 formed in the shaft 33. The projecting end of the pin 38 is preferably rounded so that it may be readily seated within or unseated from either one of the grooves 36 and 37, the spring pressure exerted against this pin being sufficient, however, to prevent accidental or unintentional axial displacement of the shaft within its sleeve 32.

The outer end of the shaft 33 is provided with a reduced end 39 of non-circular formation for projection within a corresponding non-circular aperture of the crank lever 40, the latter serving as the operating member for rotating the driving gear 34. Preferably, a headed stud 41 is employed for fixedly securing the crank lever to the driving shaft 33. As appears most clearly in Figure 3, this headed stud 41 is of a construction similar to the bearing element 18 in that it also is provided with an oil duct 42 the outer end of which is normally sealed by a spring-pressed oil seal 43. Oil from the duct 42 is supplied to the exterior surface of the hollow shaft 33 by way of the apertures 44 formed in the wall of the shaft 33.

From the foregoing description, it will be apparent that in the operation of this reel, in order to permit the spool to revolve freely without hindrance from the winding lever, it is merely necessary to shift the lever bodily away from the end plate 11 in consequence of which the driving gear 34 is disengaged from the spindle gear 30. In this position of the driving gear, the spring-pressed pin 38 is seated within the groove 36 and so maintains the driving shaft in outwardly shifted position. When it is desired to entrain the driving gear 34 with the pinion 30, it is merely necessary to shift the operating lever 40 toward the end plate 11, the spring-pressed pin being then seated within the groove 37 of the shaft whereby the latter is maintained in inwardly adjusted position and in which position the line may be wound upon the reel upon rotation of the crank lever.

It will be understood, of course, that the invention is susceptible of various changes and modifications from time to time without departing from the real spirit or general principles of the invention and it is accordingly intended to claim the same broadly, as well as specifically, as indicated by the appended claims.

What is claimed as new and useful is:—

1. In a fishing reel, in combination, a pair of end plates, a bearing element threaded into each end plate, said elements being each provided with an axial bore for respectively accommodating the ends of the spindle of a spool assembly, a spring pressed oil seal adapted to normally seal the outer end of the bore of each bearing element, said seal being retained in position against outward displacement by an integrally formed seat in the outer end of the bearing element and means affording axial communication between the outer end of each bore and that portion thereof within which the spindle end is journalled.

2. In a fishing reel, in combination, a pair of end plates, a spool assembly rotatably mounted therebetween, said assembly including a spindle having a pinion fixed to one end thereof, an axially movable stub shaft mounted within one of said end plates and having a gear upon the inner end thereof, said gear being adapted for mesh engagement with said pinion, said stub shaft being provided with a pair of axially spaced circumferential grooves, the end plate aforesaid being provided with an interiorly disposed socket extending radially of the stub shaft, and a spring-pressed detent mounted within said socket and adapted to engage one or the other of said circumferential grooves to maintain the gear in or out of mesh engagement with said pinion, said detent being inaccessible from the exterior surface of the end plate in which it is mounted.

3. In a fishing reel, in combination, an end plate, a bearing element having a tubular shank one end of which is exteriorly threaded for threaded insertion within said end plate, said shank being adapted to receive one end of the reel spool spindle, the opposite end of said bearing element being provided with an enlarged head having an axially extending flange arranged in spaced relation with respect to said tubular shank whereby to provide an annular groove or recess between said flange and the external surface of said shank, and a coil spring disposed within said annular groove or recess with the opposite ends thereof respectively abutting said enlarged head of the bearing element and the external surface of the end plate.

4. In a fishing reel, in combination, an end plate, a bearing element having a tubular shank one end of which is exteriorly threaded for threaded insertion within said end plate, said shank being adapted to receive one end of the reel spool spindle, the opposite end of said bearing element being provided with an enlarged head having an axially extending flange arranged in spaced relation with respect to said tubular shank whereby to provide an annular groove or recess between said flange and the external surface of said shank, a coil spring disposed within said annular groove or recess with the opposite ends thereof respectively abutting said enlarged head of the bearing element and the external surface of the end plate, said head being provided with a bore in axial communication with that portion of the shank within which said spindle end is journalled, and spring-pressed means for normally closing the outer end of the bore in said head.

OTTO HENZE.